United States Patent
Jung et al.

(10) Patent No.: US 8,059,076 B2
(45) Date of Patent: Nov. 15, 2011

(54) DISPLAY PANEL, MASK AND METHOD OF MANUFACTURING THE SAME

(75) Inventors: Doo-Hee Jung, Seoul (KR); Jeong-Min Park, Seoul (KR); Kyung-Su Mun, Cheonan-si (KR); Hi-Kuk Lee, Yongin-si (KR); Joo-Ae Youn, Seongnam-si (KR)

(73) Assignee: Samsung Electronics Co., Ltd. (KR)

( * ) Notice: Subject to any disclaimer, the term of this patent is extended or adjusted under 35 U.S.C. 154(b) by 1019 days.

(21) Appl. No.: 11/782,236

(22) Filed: Jul. 24, 2007

(65) Prior Publication Data

US 2008/0024415 A1    Jan. 31, 2008

(30) Foreign Application Priority Data

Jul. 27, 2006    (KR) .................. 10-2006-0070579

(51) Int. Cl.
*G09G 3/36* (2006.01)
(52) U.S. Cl. .......................... 345/92; 349/42
(58) Field of Classification Search .............. 345/92; 257/72; 438/151; 430/5; 349/42, 43, 54; 445/24
See application file for complete search history.

(56) References Cited

U.S. PATENT DOCUMENTS

| | | | |
|---|---|---|---|
| 5,598,283 A * | 1/1997 | Fujii et al. ............... | 349/143 |
| 7,304,427 B2 * | 12/2007 | Park et al. ............... | 313/504 |
| 7,394,516 B2 * | 7/2008 | Zhang ..................... | 349/153 |
| 7,663,146 B2 * | 2/2010 | Tanaka et al. ........... | 257/72 |
| 2003/0142043 A1 | 7/2003 | Matsueda | |
| 2005/0078264 A1 | 4/2005 | Yoo et al. | |
| 2005/0170290 A1 | 8/2005 | Dejima | |
| 2005/0269638 A1 | 12/2005 | Jung et al. | |

FOREIGN PATENT DOCUMENTS

| | | |
|---|---|---|
| CN | 1426044 A | 6/2003 |
| CN | 1637593 A | 7/2005 |
| CN | 1648747 A | 8/2005 |
| CN | 1707342 A | 12/2005 |

OTHER PUBLICATIONS

European Search Report for Application No. 07014513.1-1228/1882979 dated Feb. 13, 2009.
European Office Action/Examination Report for Application No. 07 014 513.1-1228 dated Aug. 10, 2010.

* cited by examiner

*Primary Examiner* — Abbas Abdulselam
(74) *Attorney, Agent, or Firm* — Cantor Colburn LLP

(57) ABSTRACT

A display panel includes a substrate, signal lines, a thin film transistor, a pixel electrode and a dummy opening. The substrate has a display area and a peripheral area surrounding the display area. The signal lines are disposed on the substrate and intersect each other to define a unit pixel. The thin film transistor is electrically connected to the signal lines and disposed at the unit pixel. The pixel electrode is electrically connected to the thin film transistor. The pixel electrode is formed in the unit pixel. The dummy opening is disposed at the peripheral area and spaced apart from the signal lines.

21 Claims, 14 Drawing Sheets

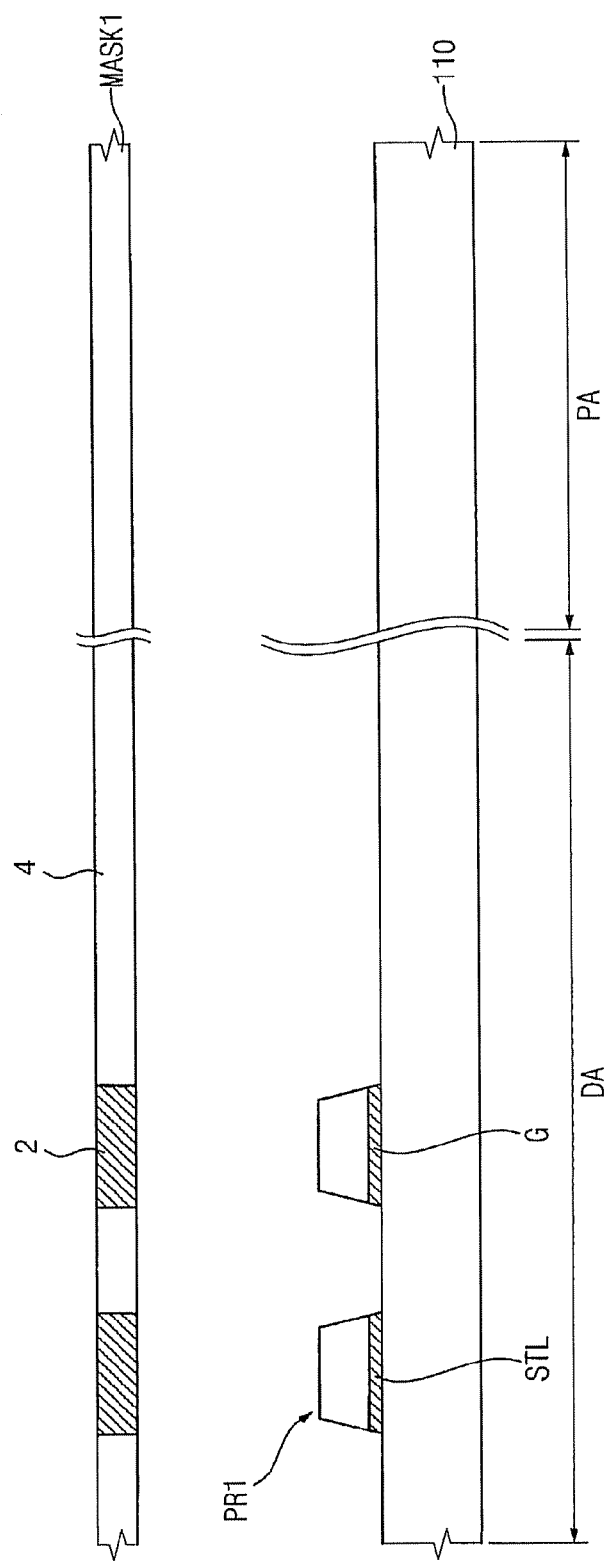

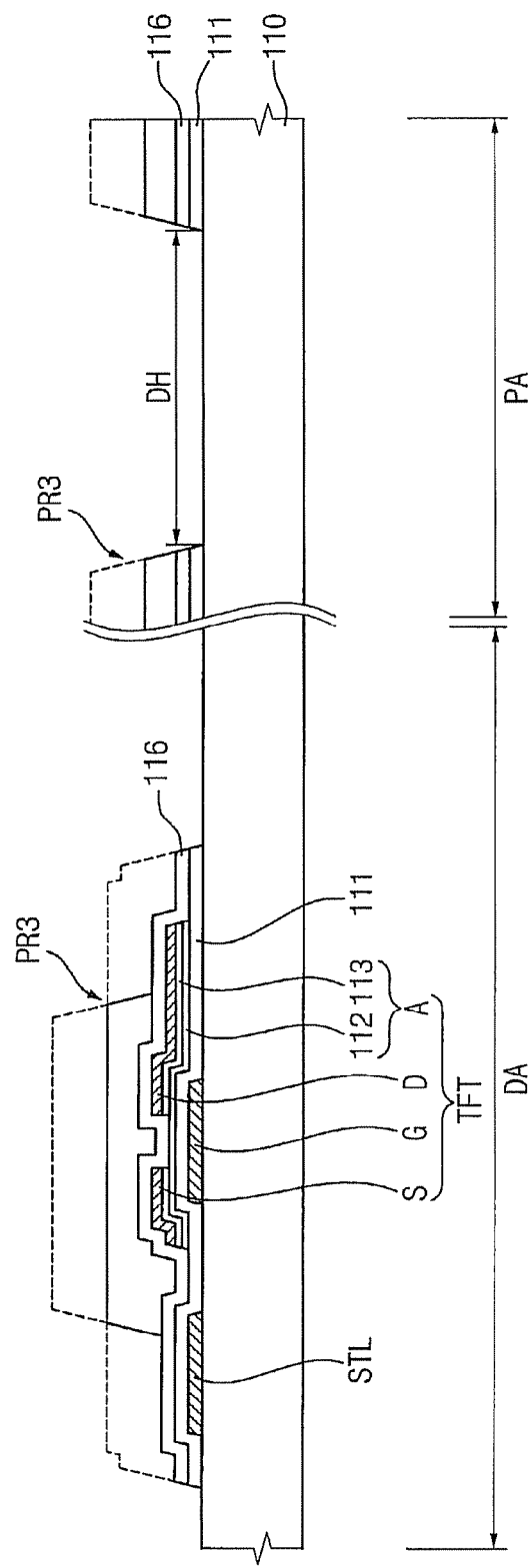

ized through a photolithography process using a mask. In the manufacture of display substrates, the ability to reduce the number of photolithography process used leads to a beneficial reduction in manufacturing costs. One way to reduce such costs in manufacturing a display substrate is by using three sheets of mask in what is known as a three-mask process.

DISPLAY PANEL, MASK AND METHOD OF MANUFACTURING THE SAME

This application claims priority to Korean Patent Application No. 2006-70579, filed on Jul. 27, 2006, and all the benefits accruing therefrom under 35 U.S.C. §119, the contents of which in its entirety are herein incorporated by reference.

BACKGROUND OF THE INVENTION

1. Field of the Invention

The present invention relates generally to a display panel, a method of manufacturing a display substrate of the panel, and a mask for implementing the manufacturing method. More particularly, the present invention relates to a display substrate capable of reducing defects that may otherwise be generated during the manufacturing process thereof, a method of manufacturing the display substrate, which is capable of regulating the thickness of a photoresist pattern formed through a three-mask process, and a mask for implementing the method.

2. Description of the Related Art

In general, signal lines, thin film transistors and pixel electrodes formed on a display substrate are patterned through a photolithography process using a mask. In the manufacture of display substrates, the ability to reduce the number of photolithography process used leads to a beneficial reduction in manufacturing costs. One way to reduce such costs in manufacturing a display substrate is by using three sheets of mask in what is known as a three-mask process.

For example, in a three-mask process, after signal lines and thin film transistors are formed on a substrate through a photolithography process using first and second masks, a passivation layer is then formed on the substrate. Sequentially, a photoresist pattern is formed on the passivation layer through another photolithography process using a third mask. The photoresist pattern overlaps the signal lines and the thin film transistors. The photoresist pattern is used for etching the passivation layer once or twice and for patterning pixel electrodes in a lift-off method.

In the event etching processes using the same photoresist pattern are performed twice, defects induced by over-etching of lower thin films may be generated. Therefore, it is important that the photoresist pattern is disposed over the entire substrate, and at a uniform thickness.

However, because the density of a photoresist pattern formed over a display substrate is typically varies from region to region, the amount of photoresist that melts during a developing process also varies from region to region.

For example, when the density of the photoresist pattern is relatively low, the amount of photoresist melt during developing of the photoresist pattern is relatively large. Moreover, in regions having low photoresist density, the acid concentration of developing solution spread on the low density regions rapidly dwindles. Thus, a concentration difference between a region having low density and a region having high density results. In turn, portions of the developing solution having a high concentration migrate to the developing solution having a low concentration. Therefore, the photoresist pattern in the low density regions becomes over developed with respect to the desired amount, resulting in an irregular thickness of the photoresist pattern.

BRIEF SUMMARY OF THE INVENTION

Aspects of the present invention provide a display substrate capable of reducing defects that may otherwise be generated during the manufacturing thereof.

Additional aspects of the present invention also provide a method of manufacturing the display substrate, which is capable of regulating thickness of photoresist pattern formed through a three-mask process.

Additional aspects of the present invention also provide a mask that may be used for implementing the above-mentioned method.

In one exemplary embodiment of the present invention, a display panel includes a substrate, signal lines, a thin film transistor and a plurality of dummy electrodes. The substrate has a display area and a peripheral area surrounding the display area. The signal lines are disposed on the substrate and intersecting each other to define a unit pixel. The thin film transistors are electrically connected to the signal lines and disposed at the unit pixel. The dummy electrodes are disposed at the peripheral area not overlapping the signal lines. The dummy electrodes include a material substantially same as that of the pixel electrode.

In another exemplary embodiment of the present invention, a photoresist film is coated on a substrate having a display area and a peripheral area surrounding the display area. The display area includes a plurality of unit pixels defined by signal lines intersecting each other. A first pattern portion overlapping the signal lines in the display area and a second pattern portion including a plurality of dummy openings are formed by patterning the photoresist film. The dummy openings are disposed at a portion not overlapping the signal lines in the peripheral area. A transparent electrode layer is formed on the substrate including the first pattern portion and the second pattern portion. Then, a dummy electrode corresponding to the dummy openings and pixel electrodes corresponding to the unit pixel are formed by removing the first pattern portion, the second pattern portion and the transparent electrode layer formed on the first pattern portion and the second pattern portion with strip solution.

In still another aspect of the present invention, a mask for manufacturing a display panel includes a pixel electrode pattern for patterning a pixel electrode, and a dummy electrode pattern for patterning a dummy electrode. The display substrate includes a display area having the pixel electrode disposed at a unit pixel and a peripheral area surrounding the display area and having the dummy electrode. The unit pixels are defined by signal lines intersecting each other, and the dummy electrode is disposed at a portion where the peripheral area and the signal lines do not overlap each other.

In forming a display panel, substrate and mask, the thickness of a photoresist pattern is made more uniform throughout all areas of the substrate. Thus, in a subsequent etching process using the uniform photoresist pattern, over etching of thin film is prevented.

BRIEF DESCRIPTION OF THE DRAWINGS

The above and other aspects, features and advantages of the present invention will become readily apparent by reference to the following detailed description when considered in conjunction with the accompanying drawings wherein:

FIGS. 5A to 5J are views illustrating a method of manufacturing a display substrate in accordance with an exemplary embodiment of the present invention.

DETAILED DESCRIPTION OF THE INVENTION

Figure 1:
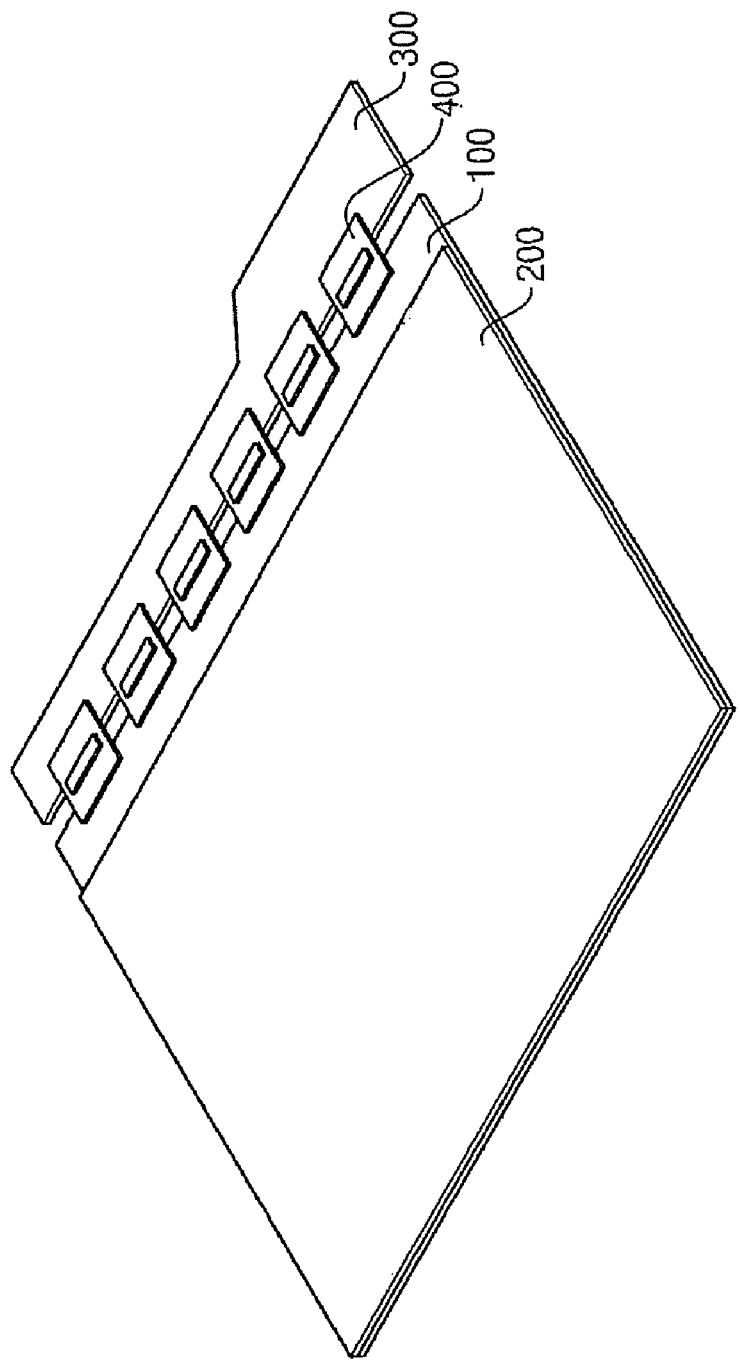
FIG. 1 is a perspective view illustrating a liquid crystal display panel in accordance with an exemplary embodiment of the present invention.

The present invention is described more fully hereinafter with reference to the accompanying drawings, in which exemplary embodiments of the invention are shown. The present invention may, however, be embodied in many different forms and should not be construed as limited to the exemplary embodiments set forth herein. Rather, these exemplary embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "lower" other elements or features would then be oriented "above" or "upper" relative to the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Exemplary embodiments of the present invention are described herein with reference to cross-section illustrations that are schematic illustrations of idealized embodiments (and intermediate structures) of the present invention. As such, variations from the shapes of the illustrations as a result, for example, of manufacturing techniques and/or tolerances, are to be expected. Thus, exemplary embodiments of the present invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be explained in detail with reference to the accompanying drawings.

Figure 2:
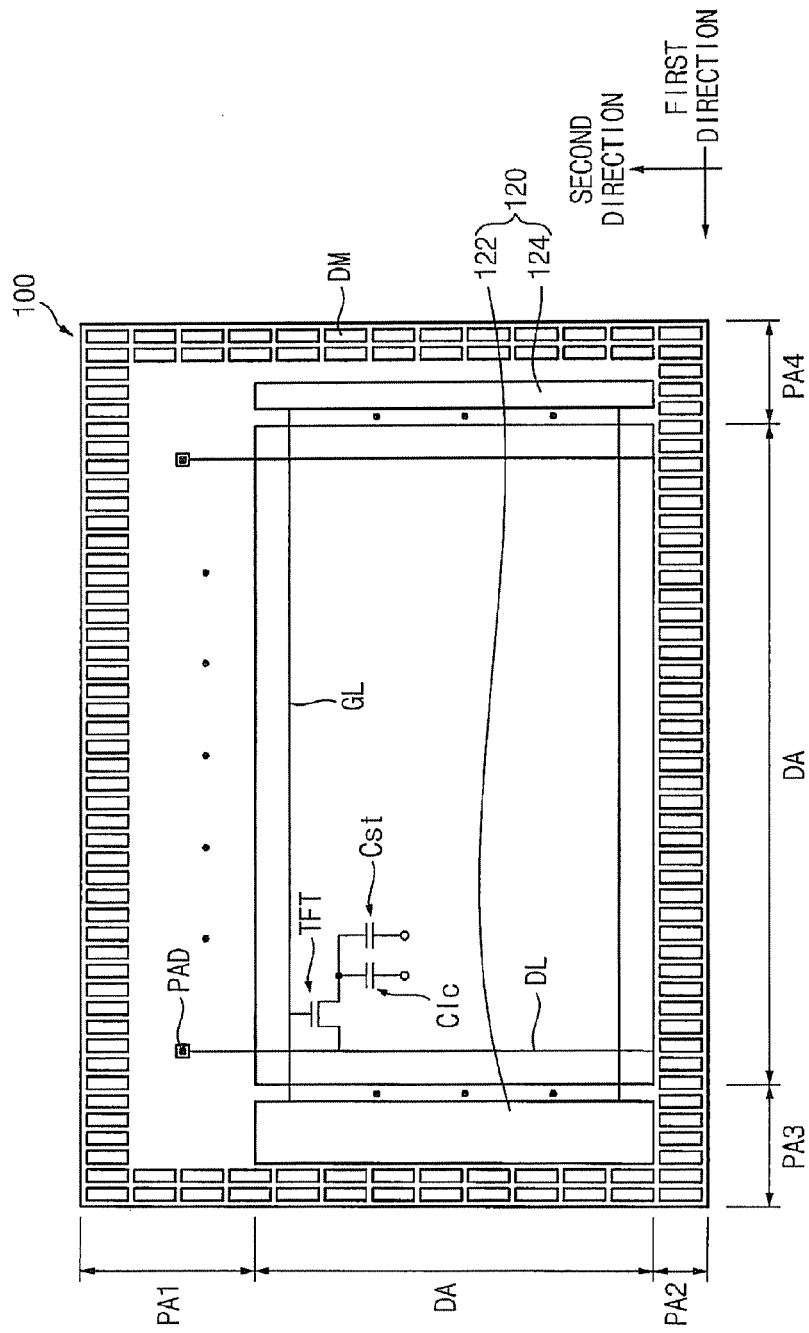
FIG. 2 is a schematic diagram illustrating a display substrate of the liquid crystal display panel in FIG. 1.

FIG. 1 is a perspective view illustrating a liquid crystal display panel in accordance with an exemplary embodiment of the present invention, and FIG. 2 is a schematic diagram illustrating a display substrate of the liquid crystal display panel in FIG. 1.

Referring to FIGS. 1 and 2, a liquid crystal display panel includes a display substrate 100, an opposite substrate 200, a liquid crystal layer (not shown), a printed circuit board 300 and a flexible printed circuit 400.

The display substrate 100 includes a display area DA for displaying images and peripheral areas PA1, PA2, PA3 and PA4 disposed outside of the display area DA. In an exemplary embodiment, the display area DA has a rectangular shape.

A plurality of data lines DL is disposed on the display area DA of the display substrate 100 along a first direction in substantially parallel manner with respect to one another. A plurality of gate lines GL is disposed along a second direction substantially perpendicular to the first direction, and substantially parallel with respect to one another. The data lines DL and the gate lines GL intersect each other and define pixel regions. Each unit pixel is disposed at each of the pixel regions.

Each of the unit pixels includes a thin film transistor TFT, a liquid crystal capacitor Clc and a storage capacitor Cst. For example, the thin film transistor TFT corresponds to a switching device.

Each of the thin film transistors TFT includes a gate electrode, a source electrode and a drain electrode. The gate electrode is electrically connected with the gate line GL, the source electrode is electrically connected with the data line DL and the drain electrode is electrically. connected with a first electrode of the liquid crystal capacitor Clc. For example, the first electrode of the liquid crystal capacitor Clc is a pixel electrode.

The opposite substrate 200 is disposed so as to face the display substrate 100. In an exemplary embodiment, the size of the opposite substrate 200 is smaller than that of the display substrate 100. The opposite substrate 200 includes color filters having color pixels corresponding to each unit pixel and a second electrode of the liquid crystal capacitor Clc. The second electrode of the liquid crystal capacitor Clc is a common electrode to which a common voltage is applied.

The liquid crystal capacitor Clc is defined by the pixel electrode connected to the drain electrode of the thin film transistor TFT and the common electrode. The storage capacitor Cst is disposed on the display substrate 100 and is defined by the pixel electrode and reference voltage lines to which a storage reference voltage is applied.

The peripheral areas PA1, PA2, PA3 and PA4 are disposed outside of the display area DA and include a first peripheral area PA1, a second peripheral area PA2, a third peripheral area PA3 and a fourth peripheral area PA4. When viewed on a plane, the first peripheral area PA1 is disposed at an upper portion of the display area DA, the second peripheral area PA2 is disposed at a lower portion of the display area DA, the third peripheral area PA3 is disposed at a left portion of the display area DA, and the fourth peripheral area PA4 is disposed at a right portion of the display area DA.

A pad portion PAD is disposed at the first peripheral area PA1 and exposes a portion of the data lines DL. The flexible printed circuit 400 is attached to the pad portion PAD.

The flexible printed circuit 400 electrically connects the printed circuit board 300 with the display substrate 100. The flexible printed circuit 400 delivers the driving signals from the printed circuit board 300 to the display substrate 100. For example, the flexible printed circuit 400 may be a tape carrier package ("TCP") or a chip-on-film ("COF").

The printed circuit board 300 includes a driving circuit unit (not shown) configured to handle image signals. The driving circuit unit converts image signals from an external source (not shown) to driving signals that control the thin film transistor TFT. The flexible printed circuit 400 is bent so that the printed circuit board 300 is disposed under the display substrate 100.

A gate driving circuit part 120 is disposed at the third and fourth peripheral areas PA3 and PA4.

The gate driving circuit part 120 generates the gate signals and applies the gate signals to the gate electrode of a given thin film transistor TFT through the associated gate line. The gate driving circuit part 120 includes a first gate circuit 122 and a second gate circuit 124. The first circuit 122 is disposed at the third peripheral area PA3. The second gate circuit 124 is disposed at the fourth peripheral area PA4.

A plurality of dummy electrodes DM is disposed in the peripheral area PA. Each dummy electrode DM includes substantially the same material as the pixel electrodes disposed at display area DA. The dummy electrodes DM are simultaneously formed with the pixel electrodes at the same layer. Each of the dummy electrodes DM has substantially the same size as the pixel electrodes.

For example, a plurality of the dummy electrodes DM is disposed in the first peripheral area PA1. The dummy electrodes DM do not overlap one other. In an exemplary embodiment, the distance between adjacent dummy electrodes is from about 8 μm to about 12 μm.

The dummy electrodes DM are disposed in the second peripheral area PA2, the third peripheral area PA3 and the fourth peripheral area PA4. However, the dummy electrodes DM do not overlap the gate driving circuit part 120.

In addition, the area proportion of the pixel electrodes in the display area DA, in an exemplary embodiment, is substantially the same as that of the dummy electrodes in the peripheral area PA.

The liquid crystal layer is disposed between the display substrate 100 and the opposite substrate 200, and is rearranged by an electric field formed between the pixel electrode and the common electrode. The rearranged liquid crystal layer controls the transmissivity light passing therethrough, from inside or outside. The controlled light, in turn, passes through the color filters and color images are displayed.

Hereinafter referring to FIGS. 2 to 4, the present invention embodiments are explained in further detail.

Figure 3:
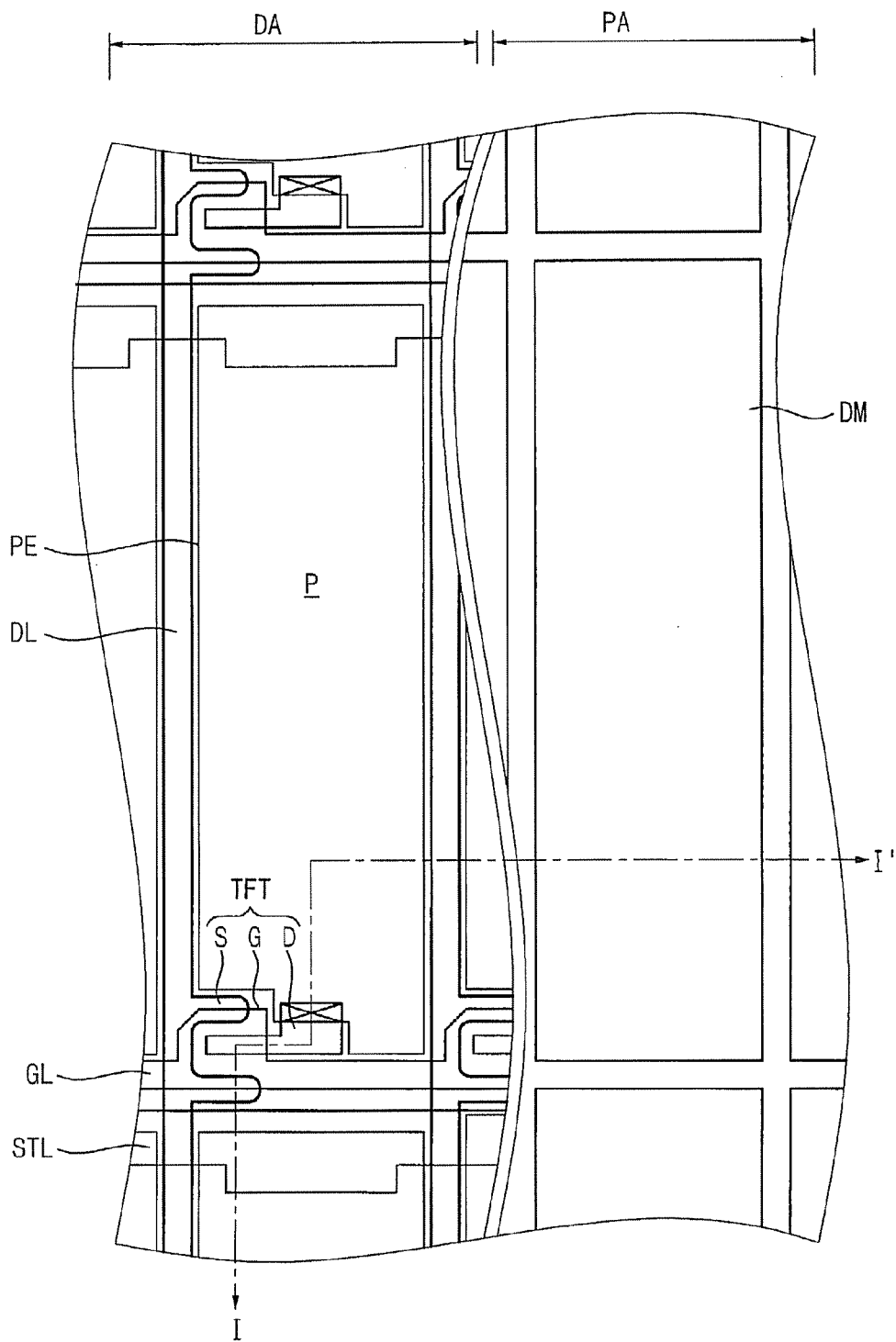
FIG. 3 is an enlarged view of a unit pixel and a dummy electrode of a display substrate.
Figure 4:
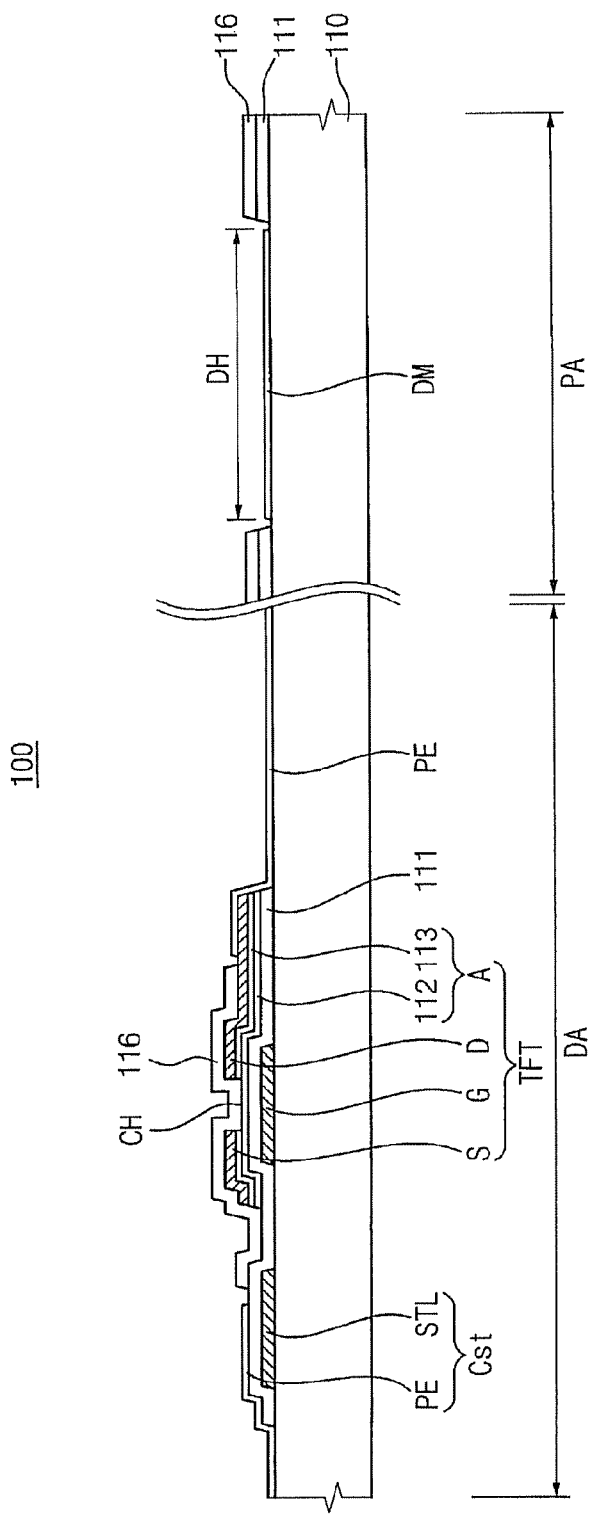
FIG. 4 is a cross-sectional view taken along the line I-I' in FIG. 3.

FIG. 3 is an enlarged view of a unit pixel and a dummy electrode of a display substrate, and FIG. 4 is a cross-sectional view taken along the line I-I' in FIG. 3.

Referring to FIGS. 2 to 4, the display substrate 100 includes a base substrate 110. The base substrate 110 includes the display area DA and the peripheral area PA. In the display area DA, a unit pixel P is defined by gate lines GL and data lines DL, which intersect each other.

A reference voltage line STL extending along substantially the same direction as the gate line GL, a thin film transistor TFT and a pixel electrode PE are also disposed in the unit pixel P.

The reference voltage line STL is a gate metal pattern and is simultaneously formed with the gate line GL in substantially the same layer as the gate line GL. In each unit pixel P, the reference voltage line STL overlaps the pixel electrode PE.

The overlapped portion defines the storage capacitor Cst.

The thin film transistor TFT includes a gate electrode G, a source electrode S, a drain electrode D and an active layer A. The gate electrode G extends from the gate line GL and is disposed in each unit pixel P. A gate metal pattern including the gate line GL, the reference voltage line STL and the gate electrode G are disposed at the base substrate 110. A gate insulating layer 111 is also disposed on the base substrate 110.

In an exemplary embodiment, the gate insulating layer 111 includes a silicon nitride ("SiN$_x$") material, and is patterned to have substantially the same shape as that of a data metal pattern. The data metal pattern includes a gate metal pattern, the data line DL, a source electrode and a drain electrode.

The data metal pattern, including the data line DL, a source line S and a drain electrode D, is formed on the base substrate 110 having the gate insulating layer 111 formed thereon.

The source electrode S extends from the data line and is disposed in each unit pixel P. The source electrode S overlaps a portion of the gate electrode G on the gate insulating layer 111. For example, the source electrode S has a substantially U-shape as shown in FIG. 3. The drain electrode D is physically separated from the source electrode, and overlaps a portion of the gate electrode G on the gate insulating layer 111. When timing signals are applied to the gate electrode G, the drain electrode S receives a pixel voltage from the source electrode S and applies the pixel voltage to the pixel electrode PE. In other words, the drain electrode D controls an output terminal of the device.

The active layer A is disposed between the data metal pattern and the gate insulating layer 111. The active layer A is patterned to have the same shape as that of the data metal pattern, and is disposed between the data metal pattern and the gate insulating layer 111.

The active layer A, for example, includes a semiconductor layer 112 and an ohmic contact layer 113 that are sequentially laminated. For example, the semiconductor layer 112 includes amorphous silicon ("a-Si") and the ohmic contact layer 113 includes amorphous silicon highly doped with an n-type ion ("n+ a-Si"). A channel CH exposing the semiconductor layer 112 is formed between the source electrode S and the drain electrode D.

A passivation layer 116 is also disposed on the base substrate 110 having the thin film transistor TFT formed thereon. The passivation layer 116, for example, includes a silicon oxide ("SiO$_x$") material or silicon nitride ("SiN$_x$") material. The passivation layer 116 is patterned so as to be overlapped with the gate line GL, the data line DL and the thin film transistor TFT in the display area DA. The passivation layer 116 exposes a portion of the drain electrode D.

The pixel electrode PE is correspondingly formed to each unit pixel P and includes an optically transparent and electrically conductive material. For example, the optically transparent and electrically conductive material may include indium tin oxide ("ITO"), indium zinc oxide ("IZO") or amorphous indium tin oxide ("a-ITO").

Further, the gate insulating layer 111 and the passivation layer 116 are patterned to overlap the gate and data metal patterns. A pixel electrode in the unit pixel directly contacts the base substrate 110. The unit pixel PE makes contact with an exposed portion of the drain electrode D and receives the pixel voltage from the drain electrode D.

The pixel electrode PE overlaps with the reference voltage line STL with the gate insulating layer 111 disposed there between to define the storage capacitor Cst. The storage capacitor Cst maintains the pixel voltage applied to the pixel electrode for a duration of one frame.

Hereinafter, dummy electrodes DM disposed at the peripheral area PA are explained in greater detail.

Gate patterns and data patterns for forming the gate driving part are disposed at the peripheral area PA. The gate insulating layer 111 is disposed between the gate patterns and the data patterns. The passivation layer 116 is disposed on the data metal patterns.

A dummy opening DH is formed where the passivation layer 116 and the gate insulating layer 111 do not overlap the gate and data metal patterns. The size of the dummy opening DH, in an exemplary embodiment is similar to the size of the unit pixel. For example, the size of the dummy opening DH is about 0.9 times to about 1.3 times that of the unit pixel, while the interval spacing between individual dummy openings DH ranges from about 8 μm to about 12 μm.

A dummy electrode DM is formed at the dummy opening DH such that the dummy electrode DM makes direct contact with the base substrate 110. The dummy electrode DM includes the same material as that of the pixel electrode PE. Since the dummy electrode DM is formed at the dummy opening DH, the size thereof is also about 0.9 times to about 1.3 times the size of the unit pixel. Additionally, the area proportion of the dummy electrode DM to the peripheral area PA is, for example, similar to the area proportion of the pixel electrode PE to the display area DA.

The dummy electrodes DM have no electrical function, but rather are formed as a consequence of the manufacturing process in forming a display substrate in accordance with an embodiment of the present invention.

FIGS. 5A to 5J are views illustrating a method of manufacturing a display substrate in accordance with an exemplary embodiment of the present invention.

Referring to FIG. 5A, a first metal layer (not shown) and a first photoresist film (not shown) are sequentially formed on a base substrate 110 including an optically transparent material and having a display area DA and a peripheral area PA. For example, the first metal layer includes metal such as chromium (Cr), aluminum (Al), tantalum (Ta), molybdenum (Mo), titanium (Ti), copper (Cu), silver (Ag), etc. or alloys thereof. The first metal layer may be formed, for example, by a sputtering process. Also, the first metal layer may actually include two or more layers having different physical characteristics.

The first photoresist film may include, for example, a positive photoresist, a portion of is dissolved by a developing solution, after exposure thereof.

As specifically shown in FIG. 5A, a first mask MASK1 is arranged over the base substrate 110 having the first photoresist film formed thereon. The first mask MASK1 includes a transmitting portion 4 configured to transmit light and a blocking portion 2 configured to block light. The first photoresist film is exposed to light by using the first mask MASK1. Then, photolithography processes are performed so as develop the exposed portions of the first photoresist film, thereby resulting in a first photoresist pattern PR1 formed on the metal layer.

Next, gate metal patterns are formed through etching process for patterning by using the first photoresist pattern PR1. The gate metal patterns include gate lines GL, gate electrodes G and reference voltage line STL. In an exemplary embodiment, the etching process comprises a wet etching process. After the wet etching, an ashing process is performed for removing the first photoresist pattern PR1 remaining on the gate metal patterns. For example, the ashing process includes an oxygen plasma process. Ashing is performed as a resist removal process after each etching process.

Alternatively, the first photoresist film may include a negative photoresist. In this case, the positions of the blocking portion 4 and a transmitting portion 2 in the first mask MASK1 are reversed with each other.

Figure 5B:
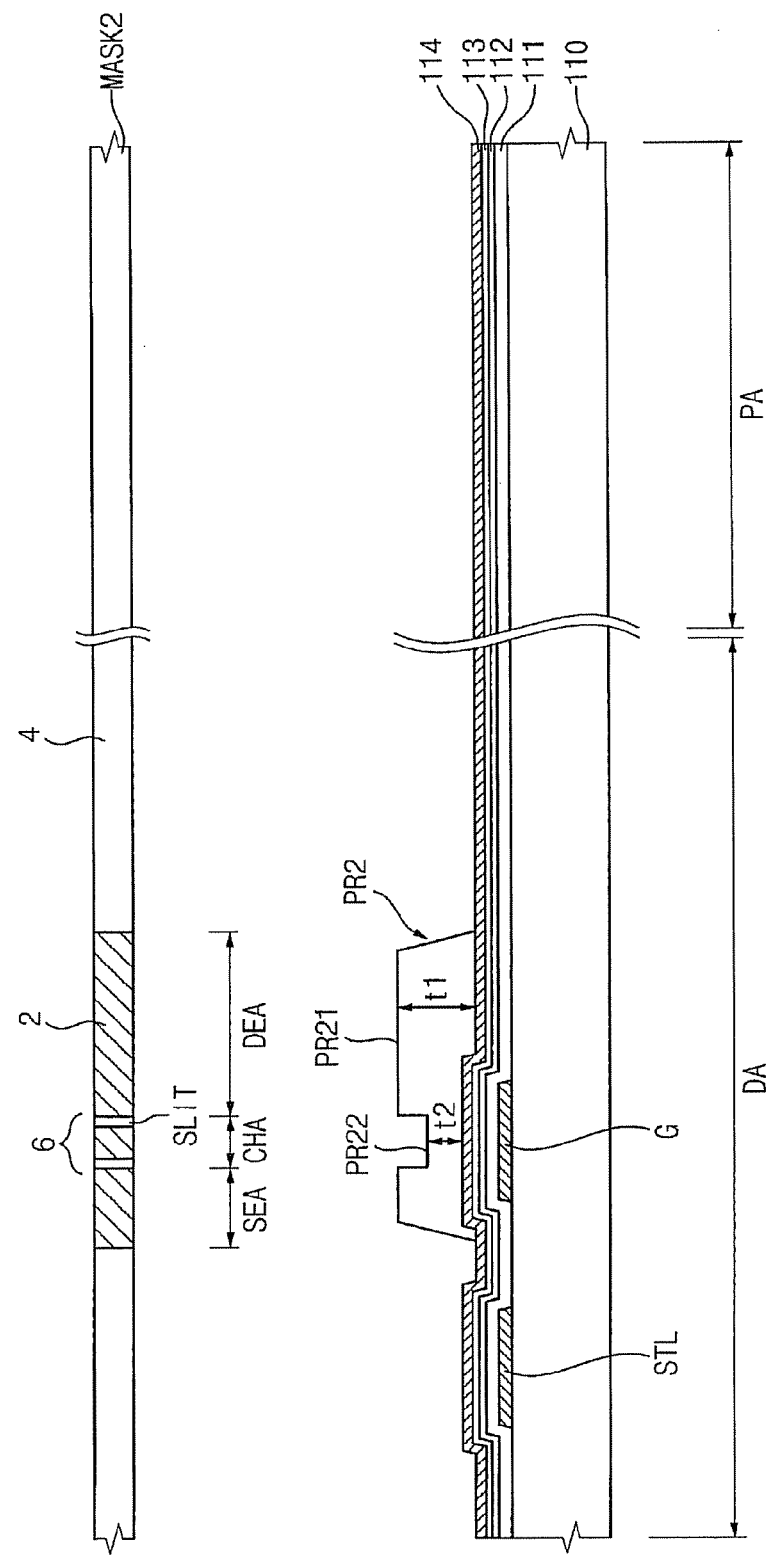

Referring now to FIG. 5B, a gate insulating layer 111 is formed on the base substrate 110 having the gate metal patterns (STL, G) previously formed thereon. The gate insulating layer 111 may include a silicon nitride ("SiN$_x$") or silicon oxide ("SiO$_x$") material. In an exemplary embodiment, the gate insulating layer 111 is formed by a plasma enhanced chemical vapor deposition ("PECVD") process. Also, the gate insulating layer 111 may be formed so as to have a double layer structure having different material and forming process.

Then, a semiconductor layer 112 including amorphous silicon ("a-Si") and an ohmic contact layer 113 including n+ amorphous silicon ("n+a-Si") are sequentially formed on the gate insulating layer 111. For example, the semiconductor layer 112 and the ohmic contact layer 113 are formed by using a PECVD.

A second metal layer 114 is disposed on the ohmic contact layer 113. For example, the second metal layer 114 includes a metal such as chromium (Cr), aluminum (Al), tantalum (Ta), molybdenum (Mo), titanium (Ti), copper (Cu), silver (Ag), etc. or alloys thereof. The second metal layer 114 may also be formed by a sputtering process, and may include two or more layers having different physical characteristics.

A second photoresist film (not shown) is formed on the second metal layer 114, the second photoresist film comprising either a positive or a negative resist material.

Then, a second mask MASK2 is arranged over a base substrate 110 having the second photoresist film formed thereabove. Photolithography steps as described above are used to develop the exposed portions of the second photoresist film, thereby forming a second photoresist pattern PR2 on the second metal layer 114.

The second photoresist pattern PR2 is formed in a source electrode area SEA in which a source electrode S of a thin film transistor TFT is to be formed, a channel area CHA in which a channel part CH is to be formed, a drain electrode area DEA in which a drain electrode D is to be formed, a reference voltage area STA in which reference voltage line STL is to be formed and a data line area DLA (not shown) in which the data lines DL is to be formed.

In particular, the second photoresist pattern PR2 includes a first pattern PR21 and a second pattern PR22. The first pattern PR21 is formed at the source electrode area SEA and the drain electrode area DEA at a first thickness t1. The second pattern PR22 is formed at the channel area CHA and has a second thickness t2.

The first pattern PR21 is patterned through a blocking portion 2 of the second mask MASK2. The second pattern PR22 is patterned through a diffraction portion 6 of the second mask MASK2. The diffraction portion 6 includes slit patterns (SLIT) that diffract light. Accordingly, the amount of light passing through slit patterns is less than the amount of light passing through the exposing portion 4. As a result, the second thickness t2 of the second pattern PR22 is thinner than the first thickness t1 of the first pattern PR21.

Figure 5C:
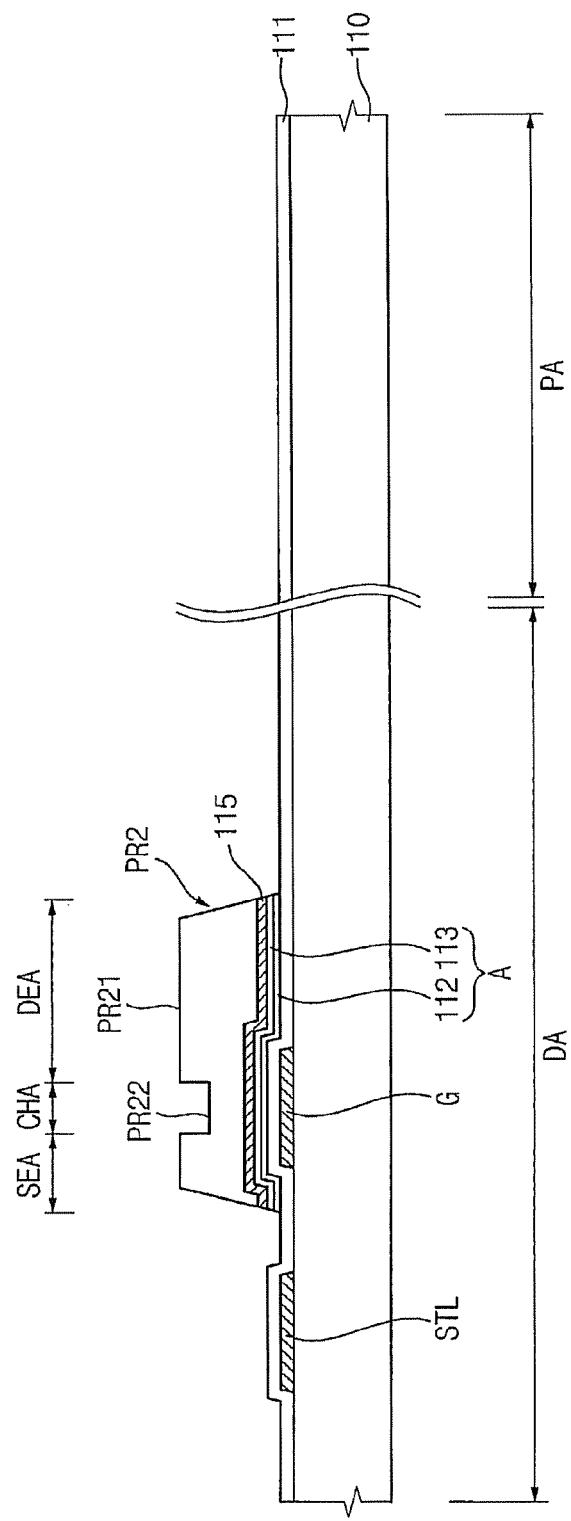

Referring to FIGS. 5B and 5C, the second metal layer 114 is etched by using the second photoresist pattern PR2. As a result, a data metal pattern having the data line DL and the electrode pattern 115 is formed. The electrode pattern 115 extends from the data line DL and includes preliminary source and drain electrodes connected to each other.

Then, the semiconductor layer 112 and the ohmic contact layer 113 are also etched by using the second photoresist pattern PR2. For example, the semiconductor layer 112 and the ohmic contact layer are etched by using a dry etching method. As a result, an active layer having the substantially same shape as that of the data metal pattern is formed under the data metal pattern.

Figure 5D:
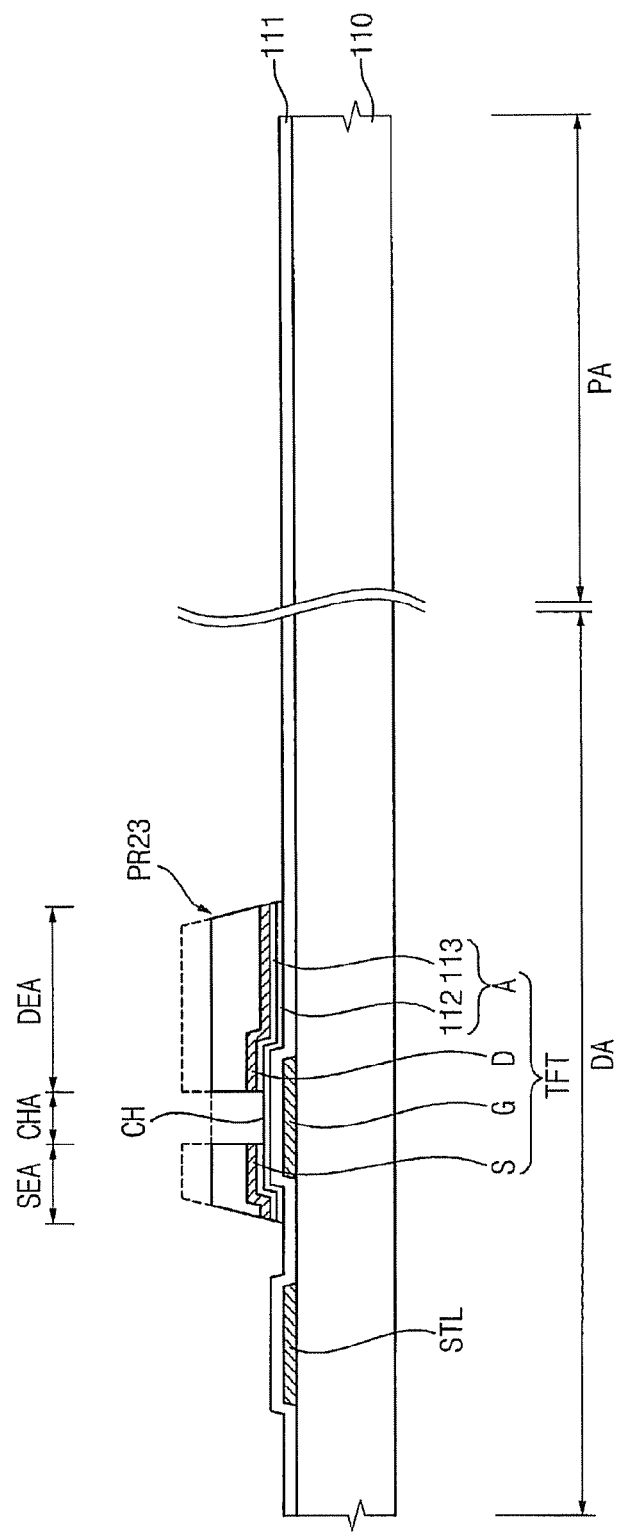

Referring to FIGS. 5C and 5D, the overall thickness of the second photoresist pattern PR2 (initially having the first and second patterns PR21 and PR22) is reduced through an ashing process using, for example, oxygen plasma. The resulting reduced thickness is thinner than the first thickness t1 and thicker than the second thickness t2.

Through the ashing process, the second pattern PR22 formed at the channel area CHA is removed, and the first pattern PR21 is transformed into a third pattern PR23 and remaining at the source electrode area SEA, the drain electrode DEA and the data line area (not shown).

Then, by using the third pattern PR23, the electrode pattern 115, having the preliminary source and drain electrodes initially connected to one other is etched to form the source electrode S and the drain electrode D that are separated from one another.

Next, the ohmic contact layer 113 exposed between the source electrode S and the drain electrode D is etched so as to form a channel CH that exposes the semiconductor layer 112. Thus, a completed thin film transistor TFT having a gate electrode G, a source electrode S, a drain electrode D and an active layer A is formed on the base substrate 110. Then, through an ashing process (e.g., using oxygen plasma), the third pattern PR23 remaining on the thin film transistor TFT is removed.

Figure 5E:
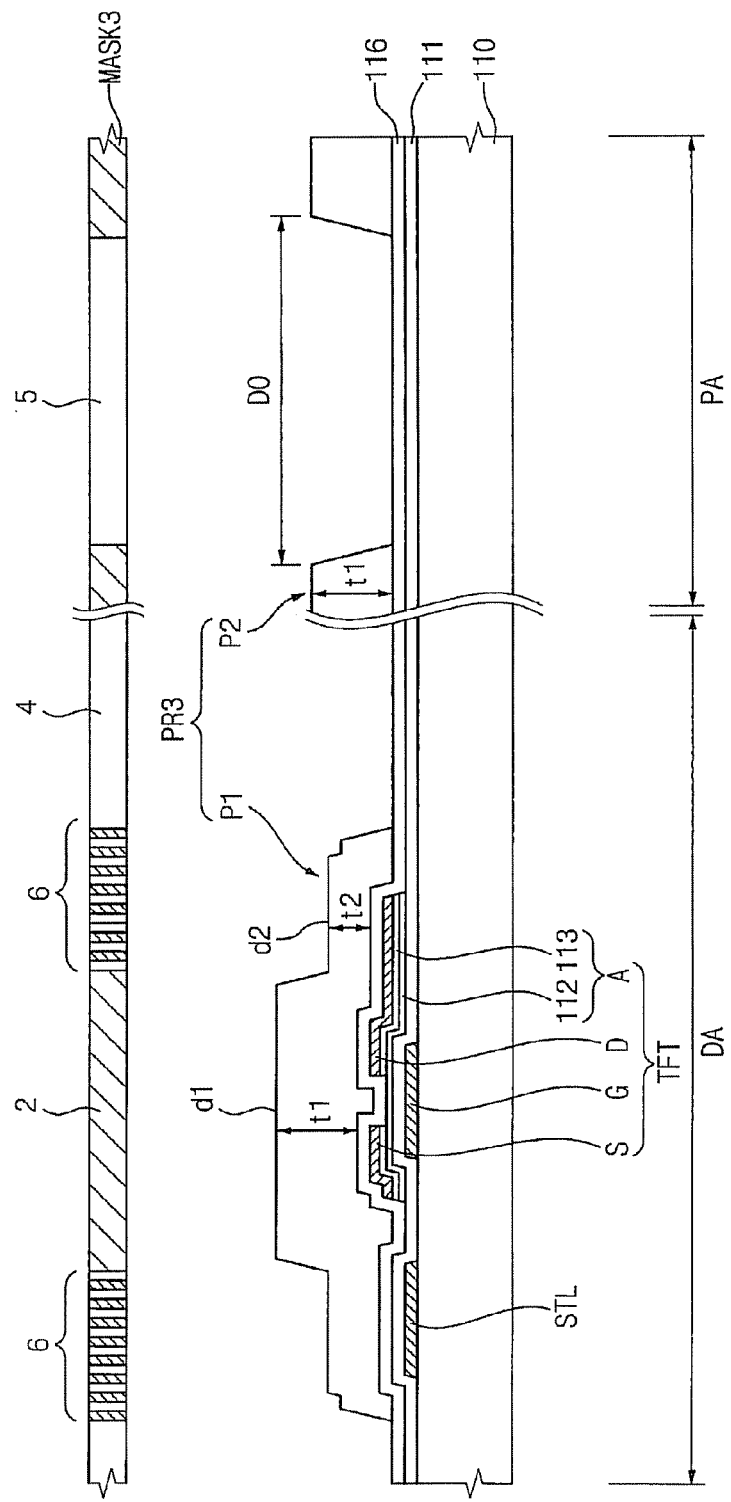

Referring to FIGS. 3 and 5E, a passivation layer 116 is formed over the base substrate 110, including the thin film transistor TFT formed thereon. A third photoresist film (not shown) is formed over the base substrate 110, including having the passivation layer 116. The third photoresist film includes, for example, a positive photoresist, the exposed portion of which is dissolved by developing solution. Through suitable photolithography processes using a third mask MASK3, the third photoresist film is then patterned to form a third photoresist pattern PR3.

Figure 5F:
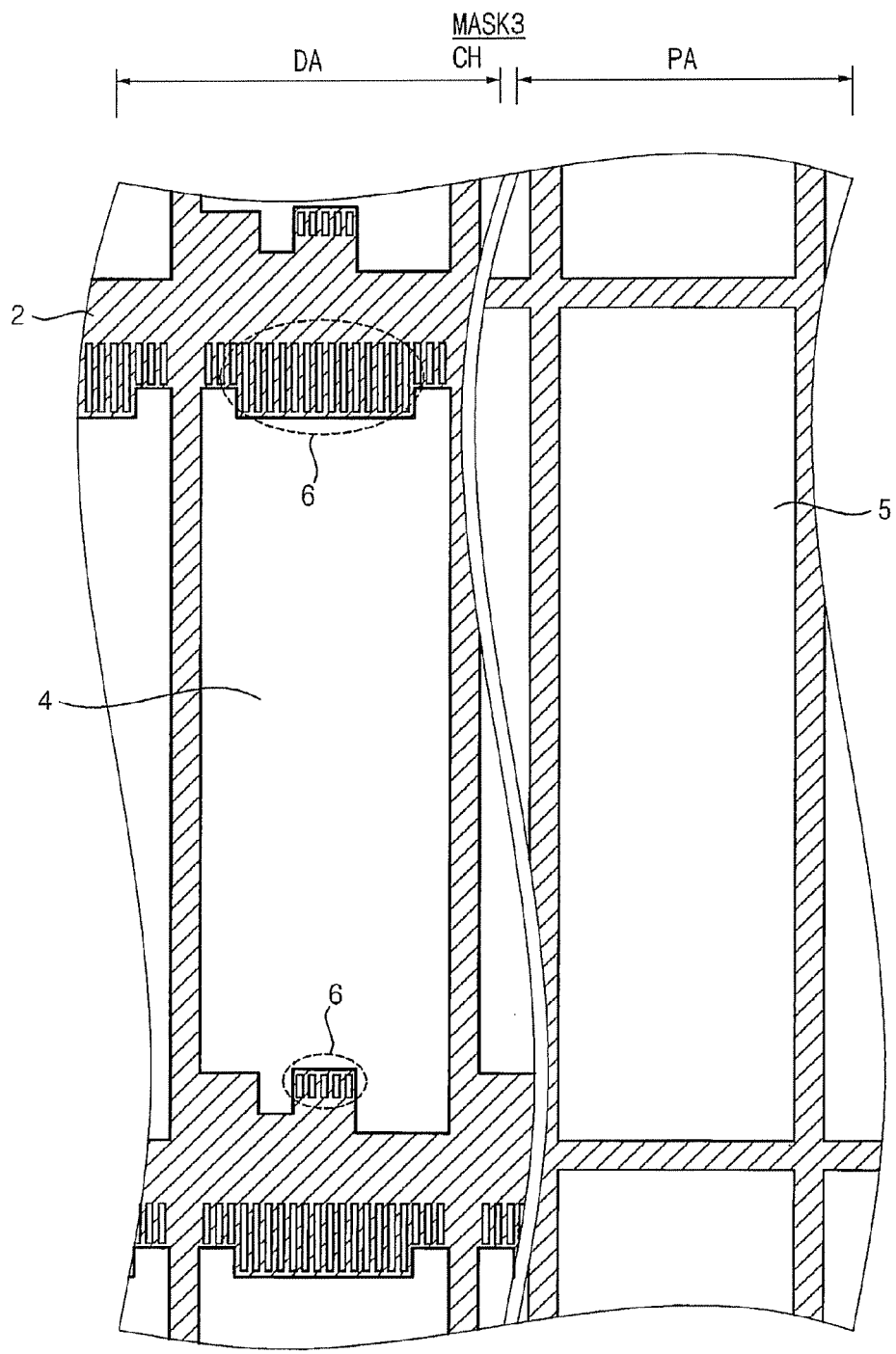

FIG. 5F is a plan view illustrating a third mask corresponding to a display substrate in FIG. 3.

An exemplary photolithography process for forming the third photoresist pattern PR3 will be explained in detail, referring to FIGS. 3, 5E and 5F.

The third mask MASK3, having a blocking portion 2, a transmitting portion 4, a diffraction portion 6 and a dummy transmitting portion 5, is disposed over a the base substrate corresponding to the location of the third photoresist pattern PR3. The third photoresist film is exposed to light passing through the third mask MASK3. In display area DA, the diffraction pattern 6 includes a plurality of slit patterns configured to diffract light, and are disposed at a position corresponding to a portion of drain electrode D and reference voltage line STL. The blocking portion 2 overlaps a portion of the gate and data metal pattern not having a portion of the drain electrode D and a reference voltage line STL. The transmitting portion 4 is disposed a position corresponding to remaining portions not including the blocking portion 2 and the diffraction portions 6. The transmitting portion 4 and the diffraction portions 6 form a pixel electrode pattern for patterning a pixel electrode PE in each unit pixel P.

The dummy transmitting portion 5 is disposed to correspond to the peripheral area PA, and is configured to form the dummy electrodes DM.

Then, developing solution is spread on the third photoresist film exposed by the third mask MASK3, dissolving an exposed portion of the third photoresist film. After a washing process of the base substrate is then performed, the unexposed portions of the third photoresist film form the third photoresist pattern PR3.

The third photoresist pattern PR3 includes a first pattern portion P1 disposed at the display area DA, and a second pattern portion P2 disposed at the peripheral area PA. The first pattern portion P1 overlaps the gate metal pattern and the data metal pattern. The first pattern portion P1 includes a first thickness portion d1 having a first thickness t1, and a second thickness portion d2 having a second thickness t2 thinner than the first thickness t1. The first thickness portion d1 is patterned through the blocking portion 2. The second thickness portion d2 is patterned through the diffraction portion 6, and is disposed to correspond to a portion of a drain electrode D and reference line STL.

The first pattern portion P1 overlaps both the gate metal pattern and data metal pattern, and thus the first pattern portion P1 is not disposed within most of the portions in unit pixel P. In the developing process for forming the third photoresist pattern PR3, the third photoresist layer formed at the unit pixel P is developed by the developing solution. As a result, acid concentration of the developing solution spread on the display area DA rapidly decreases during the developing process.

In the unit pixel P, a region not having the first pattern portion P1 and having the second thickness portion d2 corresponds to a region where the passivation layer 116 will be etched and the pixel electrode will be formed during a subsequent process.

Referring to FIGS. 2, 3 and 5E, the peripheral area PA does not include the pixel electrode. Thus, the passivation layer 116 does not need to be etched in these areas, except for a portion including the gate driving part 120 and pad part PAD.

The second pattern portion P2 disposed at the peripheral area PA covers most of the peripheral area PA. As such, the amount of dissolved photoresist by developing solution in the peripheral area PA is smaller than that in the display area DA.

Therefore, the developing solution therefore maintains a relatively higher acid concentration in the peripheral area PA than that in the peripheral area DA.

Whenever a concentration difference within developing solution is generated as described above, a region of high concentration moves toward a region of low concentration according to the principle of diffraction. Accordingly, the first pattern portion P1 disposed around the display area DA is continually exposed to a developing solution of high acid concentration after being appropriately developed.

As a result, the first pattern portion P1 disposed around the display area DA may be overdeveloped with respect to a desired amount. When the first pattern portion P1 is overdeveloped, the thickness of the first pattern portion P1 becomes irregular, and films of the lower portion around the display area DA may thereafter be over etched during a subsequent etching process.

In an embodiment of the present invention, the density of the first pattern portion P1 and the density of the second pattern P2 become more uniform or are substantially equalized by forming a dummy transmitting portion 5 in the third mask MASK3 corresponding to the peripheral area PA.

As a result, the amount of photoresist dissolved in the display area DA and the peripheral area PA is made substantially more uniform. Accordingly, the concentration difference between developing solution spread on the display area DA and the peripheral area PA can be reduced.

As indicated above, any over etching defects of the first pattern portion P1 disposed around display area DA are restrained while the thickness of the third photoresist pattern PR3 disposed on the base substrate 110 is made more uniform. Also, a plurality of dummy openings DO patterned by the dummy transmitting portion 5 is disposed at the second pattern portion P2 disposed on the peripheral area PA.

In an exemplary embodiment, each of the dummy openings DO is substantially same size as the unit pixel P. In particular, the size of each of the dummy openings DO may range from about 0.8 times to about 1.3 times the size of the unit pixel P.

The dummy opening DO in FIG. 5E is disposed at a portion under which gate and data metal patterns are not present. In an exemplary embodiment, the distance between each of the dummy openings DO ranges from about 8 µm to about 12 µm.

Alternatively, the photoresist film for forming the third photoresist pattern PR3 may be a negative photoresist. In this case, a position of the blocking portion 4 and the transmitting portion 2 in the third mask MASK3 is switched with each other. In addition, the dummy transmitting portion 5 is replaced by a dummy blocking portion. Referring to FIGS. 5E and 5G, the passivation layer 116 and the gate insulating layer 111 are first dry-etched by using the third photoresist pattern PR3. As a result, a portion of a base substrate 110 where the gate metal pattern and the data metal pattern do not overlap each other is exposed in display area DA. Also, the dummy opening holes DH are defined through the portions of passivation layer 116 located in the peripheral area PA.

As explained above with reference to FIG. 5E, the thickness of the third photoresist pattern PR3 is substantially uniform throughout the entire region of the base substrate 110. Thus, any over etching of the passivation layer 116 and gate insulating layer 111 is limited during the first dry-etching process.

As a result, gate and data metal patterns protected by the passivation layer 116 and the gate insulating layer 111 are not exposed. Therefore, any defects of the gate and data metal patterns, which are otherwise created from being exposed during conventional fabrication processes, are now prevented in subsequent etching processes. Additionally, defects created from electrical shorting between lines and pixel electrodes are also prevented in the subsequent pixel electrode patterning process.

As depicted in FIG. 5G, a portion of the thickness of the third photoresist pattern PR3 is removed through an ashing process using oxygen plasma. The reduced thickness is thicker than the second thickness t2 and thinner than the first thickness t1. As a result, the second thickness portion d2 (FIG. 5E) is removed, and the corresponding portions of passivation layer 116 in these removed regions are now exposed.

Figure 5H:
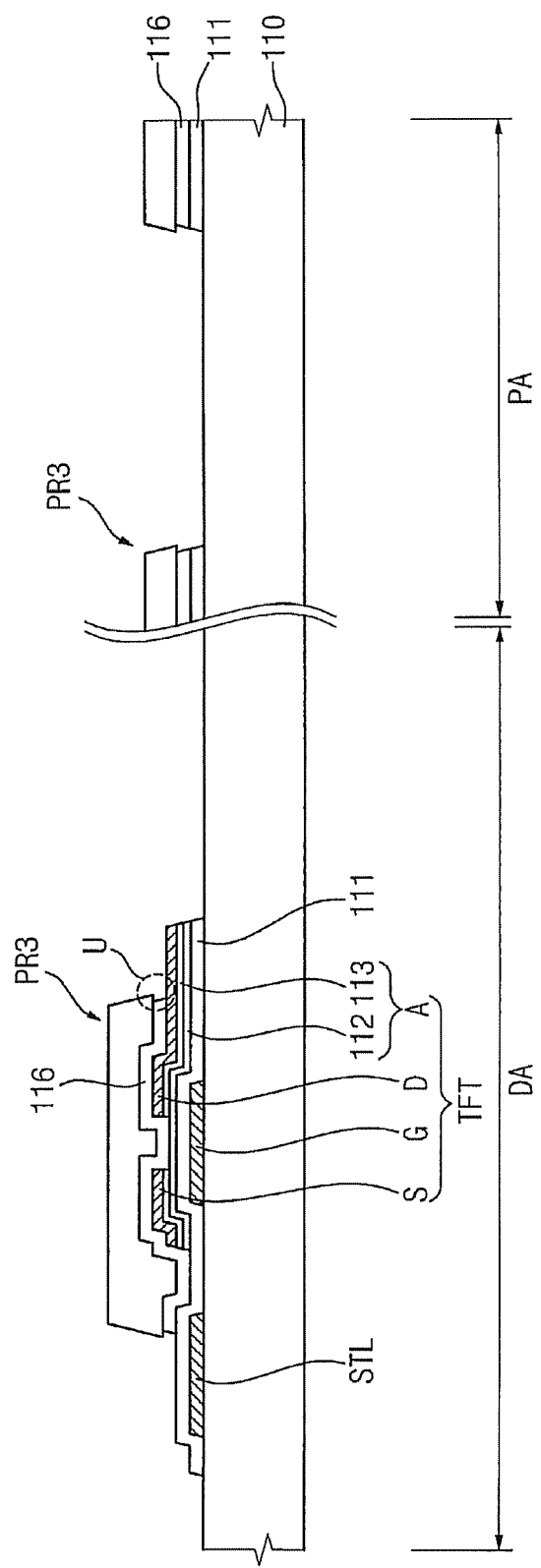

Referring now to FIG. 5H, the newly exposed portions of passivation layer 116 are etched by using the remaining portions of the third photoresist pattern PR3. For example, this second etching process is a dry-etching process. In the second-etching process, the passivation layer 116 is etched isotropically such that an outer edge of the passivation layer 116 undercuts an outer edge of the third photoresist pattern PR3, as depicted by the region U in FIG. 5H.

Figure 5I:
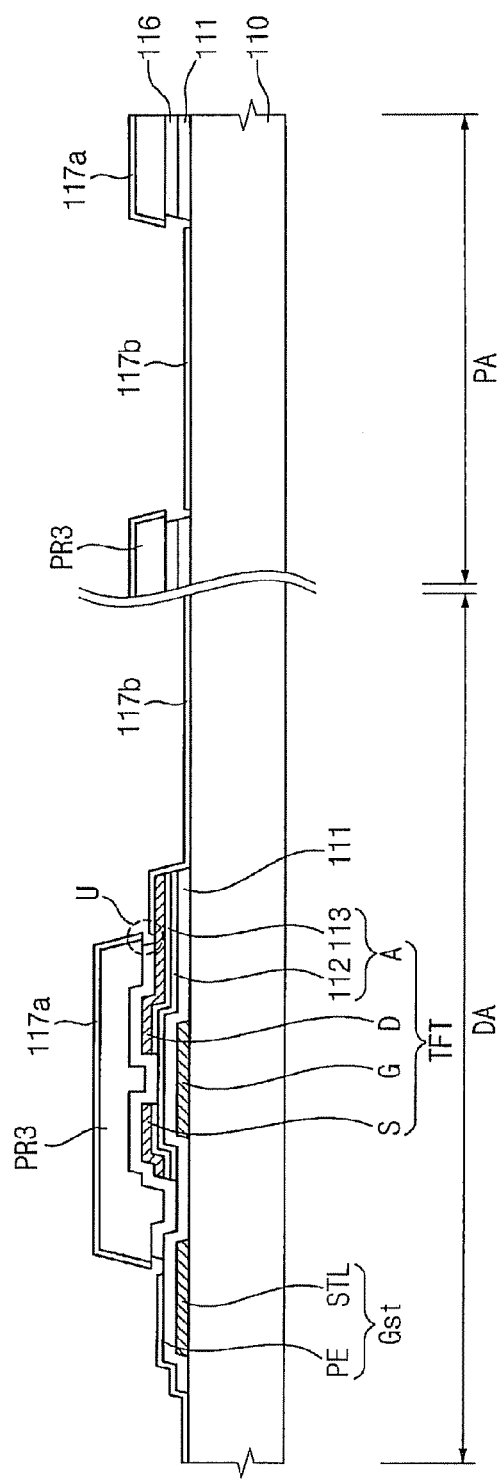

Referring now to FIG. 5I, transparent electrode layers 117a and 117b are deposited over the base substrate 110 and structures thereon. For example, the transparent electrode layers 117a and 117b include ITO or IZO deposited by sputtering.

When the transparent electrode layers 117a and 117b are deposited, the transparent electrode layer 117a disposed on the third photoresist pattern PR3 and the transparent electrode layer 117b disposed on the base substrate 110 are electrically disconnected from one other due to the under cut U.

Figure 5J:
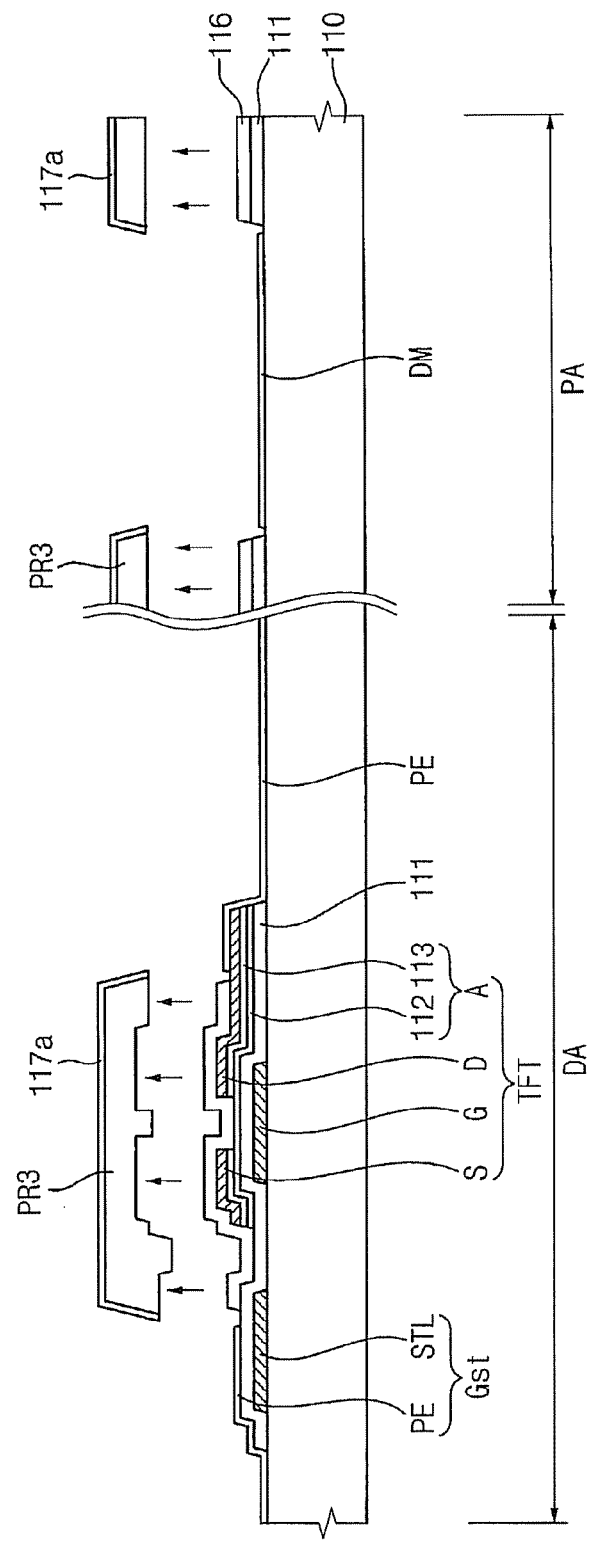

Referring to FIGS. 5I and 5J, the base substrate 110, including the transparent electrode layers 117a and 117b is soaked in a strip solution (i.e., photoresist stripper). The photoresist stripper is introduced into the third photoresist pattern PR3 through the under cut U and lifts the third photoresist pattern PR3 off of the base substrate 110 (i.e., a lift off process). As a result of the lift off process, the third photoresist pattern PR3 is separated from the base substrate 110 and the transparent electrode layer 117a disposed on the third photoresist pattern PR3 is also removed from the base substrate 110.

Thereby, a pixel electrode in contact with a portion of the drain electrode D is patterned on each of the unit pixels P. Additionally, a dummy electrode DM is patterned at the dummy opening hole DH. In an exemplary embodiment, the size proportion of the pixel electrode in the display area DA is substantially the same as the size proportion of the dummy electrode DM in the peripheral area PA.

Table 1 below illustrates exemplary data regarding thickness differences within the third photoresist pattern.

TABLE 1

|  | Thickness Difference from Display Area (Conventional process) | Thickness Difference from Display Area (Example embodiment of the present invention) |
|---|---|---|
| first peripheral area | 1500 Å | 900 Å |
| second peripheral area | 4000 Å | 1000 Å |
| third peripheral area | 500 Å | 500 Å |
| fourth peripheral area | 1000 Å | 500 Å |

As used above, the "conventional process" refers to various thickness differences of a conventionally formed third photoresist pattern not including dummy openings DO in a peripheral area PA. In the inventive example, the representative thicknesses are for a third photoresist pattern that does include dummy openings DO in a peripheral area PA, as described above.

The values of the conventional process example in TABLE 1 refer to a thickness difference between the thickness of a third photoresist pattern disposed at a center portion of the display area DA and the thickness of the third photoresist pattern disposed at various edge (peripheral) portions of the display area DA.

Similarly, the values of the example of the present invention in TABLE 1 also refer to a thickness difference between the thickness of a third photoresist pattern disposed at the center portion of the display area DA and the thickness of the third photoresist pattern disposed at various edge (peripheral) portion of the display area DA.

As reflected in TABLE 1, the thickness difference of each peripheral portion of the third photoresist pattern, with respect to the display area, is reduced throughout all peripheral areas according to the example of the present invention.

Particularly, the thickness difference of the third photoresist pattern is maximally reduced in a second peripheral area PA2 (i.e., from a conventional difference of 4000 Å down to an improved difference of 1000 Å), which has a relatively larger area for forming dummy openings DO because no gate driving circuit part 120 is formed therein and no flexible printed circuit is attached thereto.

In a third peripheral area PA3, which has minimal area for forming the dummy opening DO because the gate driving circuit part 120 is formed therein, the thickness difference of the third photoresist pattern is equal between the comparative conventional example and the example of the present invention.

Thus, by forming dummy openings DO at a peripheral area PA, the thickness of the third photoresist pattern PR3 can be made more uniform throughout all areas.

As will thus be appreciated, by forming a dummy transmitting portion at a region of a third mask, the region corresponding to a peripheral area of a display substrate, the thickness of a developed photoresist film disposed at a display area and a peripheral area may be substantially more uniform. As a result, the acid concentration spread on a display area and a peripheral area is uniformly maintained uniformly and over-etching defects of a third resist pattern disposed around a display area is prevented. Thus, the thickness of the third resist pattern is more uniform and defects caused from over-etching in etching process are prevented.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A display substrate, comprising:
   a substrate having a display area and a peripheral area surrounding the display area;
   a plurality of signal lines disposed on the substrate and intersecting one other so as to define a unit pixel in the display area;
   a thin film transistor electrically connected to the signal lines and disposed at the unit pixel;
   a pixel electrode electrically connected to the thin film transistor, the pixel electrode formed in the unit pixel; and
   a dummy opening hole disposed at the peripheral area and spaced apart from the signal lines, wherein the dummy opening hole exposes the substrate.

2. The display substrate of claim 1, wherein the signal lines further comprise:
   a plurality of gate lines disposed in a first direction on the substrate and substantially parallel to one another;
   a reference voltage line disposed between the gate lines and substantially parallel with the gate lines, the reference voltage line formed from substantially the same layer as the gate lines; and
   a plurality of data lines disposed in a second direction on the substrate and substantially parallel to one another, the data lines intersecting the gate lines to define the unit pixel.

3. The display substrate of claim 2, further comprising:
   an insulating layer disposed between the gate lines and the data lines, and overlapping the gate lines; and
   a passivation layer formed over the substrate, the data lines, the gate lines, the reference voltage line, and the thin film transistor.

4. The display substrate of claim 3, further comprising a dummy electrode formed in the dummy opening hole.

5. The display substrate of claim 4, wherein the dummy electrode includes substantially same material as the pixel electrode.

6. The display substrate of claim 4, wherein the dummy electrode directly contacts the substrate.

7. The display substrate of claim 3, wherein the dummy opening hole is formed within the insulating layer and the passivation layer.

8. The display substrate of claim 1, wherein the dummy opening hole has a size in a range from about 0.8 times to about 1.3 times a size of the pixel electrode.

9. The display substrate of claim 1, wherein an area proportion of the pixel electrodes formed in the display area is substantially the same as an area proportion of the dummy opening holes in the peripheral area.

10. A method for manufacturing a display substrate, the method comprising:
    coating a photoresist film on a substrate having a display area and a peripheral area surrounding the display area, the display area including a plurality of unit pixels defined by signal lines intersecting each other;
    forming a first pattern portion overlapping the signal lines in the display area and a second pattern portion having a plurality of dummy opening holes by patterning the photoresist film, the plurality of dummy opening holes disposed at a region spaced apart from the signal lines in the peripheral area;
    forming a transparent electrode layer on the substrate, including the first pattern portion and the second pattern portion formed thereon; and
    removing the first pattern portion, the second pattern portion and the transparent electrode layer with strip solution to form dummy electrodes corresponding to the dummy opening holes and pixel electrodes corresponding to the unit pixel.

11. The method of claim 10, further comprising:
    forming gate lines on the substrate;
    forming an insulating layer on the gate lines and the substrate;
    forming data lines intersecting the gate lines; and
    forming a passivation layer on the substrate, including the gate lines and the data lines formed thereon.

12. The method of claim 11, further comprising:
prior to forming the transparent electrode layer, etching the insulating layer and the passivation layer by using the first and second pattern portions;
reducing a thickness of the first and second pattern portions; and
etching the passivation layer using the first and second pattern portions having the reduced thickness.

13. The method of claim 12, wherein:
the first pattern portion is initially formed in a manner so as to comprise a first thickness portion having a first thickness, t1 and second thickness portion having a second thickness, t2, with t1 greater than t2; and
reducing the thickness of the first pattern further comprises reducing the thickness of the first thickness portion and eliminating the second thickness portion, such that remaining portions of the first thickness portion define a third pattern portion.

14. A mask for manufacturing a display panel, the display panel comprising a substrate including a display area having a pixel electrode disposed at a unit pixel and a peripheral area surrounding the display area and having a dummy opening hole, a plurality of unit pixels being defined by signal lines intersecting each other and the dummy opening hole being disposed at a portion where the peripheral area spaced apart from the signal lines, the mask comprising:
a pixel electrode pattern for patterning the pixel electrode; and
a dummy pattern for patterning the dummy opening hole, wherein the dummy opening exposes the substrate.

15. The mask of claim 14, wherein the dummy pattern has a size of about 0.8 times to about 1.3 times that of the pixel electrode pattern.

16. The mask of claim 14, wherein an area proportion of the pixel electrode pattern corresponding to the display area is substantially the same as an area proportion of the dummy opening holes corresponding to the peripheral area.

17. The mask of claim 14, wherein a distance between the dummy patterns is in a range from about 5 μm to about 15 μm.

18. The mask of claim 14, wherein the pixel electrode pattern and the dummy pattern transmit light.

19. The mask of claim 14, wherein the pixel electrode pattern and the dummy pattern block light.

20. The mask of claim 14, wherein at least a portion of the pixel electrode pattern further comprises a diffraction pattern.

21. The mask of claim 20, wherein the diffraction pattern is configured to transmit less light with respect to a fully transmissive portion of the mask.

* * * * *